2,865,087
Patented Dec. 23, 1958

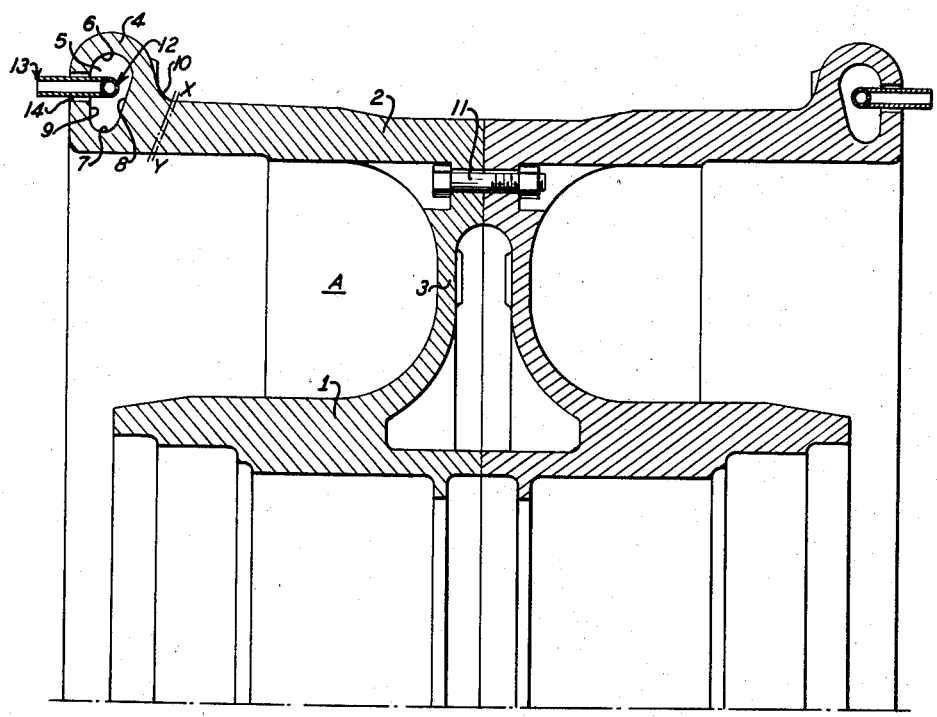

2,865,087
METHOD OF MANUFACTURING A WHEEL

René Lucien, Paris, France, assignor to Societe d'Inventions Aeronautiques et Mecaniques S. I. A. M., Fribourg, Switzerland, a societe anonyme of Switzerland Application November 30, 1953, Serial No. 395,155

Claims priority, application France August 4, 1953

2 Claims. (Cl. 29—159)

This invention relates to methods of manufacturing wheels.

It is an object of the invention to provide an improved method for manufacturing wheels having toroidal cavities.

It is a further object of the invention to provide an improved method for manufacturing wheels which method is both facile and economical.

It is still another object of the invention to provide an improved method for manufacturing improved wheels essentially suitable for use in aircraft and the like.

Another object of the invention is to provide an improved method for manufacturing wheels which are greatly resistant to fatigue and which are capable of supporting extremely large loads.

Briefly, in accordance with a preferred embodiment of the invention, there is contemplated a method in which a toroidal core is supported in a mould by a circular hollow tube supported on a plurality of radially extending hollow tubes. After the core material is cured and the resultant gases vented through the hollow tubes, a cutting tool is employed to cut the circular hollow tube and core into sections which are thereafter withdrawn from the mould.

In accordance with a feature of the invention, orifices through which the tube and core sections are withdrawn are threaded and closed by means of the use of threaded plugs.

Other objects and features of the invention, as well as advantages thereof, will be found in the following detailed description as illustrated by the accompanying drawing, wherein the sole figure, which is a partially broken away view, illustrates the provisions for moulding a wheel in accordance with a method of the invention.

A wheel with which the invention is concerned is shown in the appended drawing in which the sole figure is a longitudinal cross section of an assembly of two united half wheels.

In this drawing, A is a large space between the hub 1 and the rim 2, which are united by webs 3. The junction between flange 4 and rim 2 is shown at x—y. Said junction is provided by the conventional neck 10. Each flange 4 is provided with a toroidal cavity 5. In this example, the cross-section of the cavity is limited by a pair of curves 6 and 7 facing each other with their concave sides and interconnected by straight lines 8 and 9, line 8 being suitably inclined in order to provide, at right angle with the neck 10, for an amount of metal which is sufficient to resist the stresses to which the wheel will be subjected.

The wheel, as designed, has a great resistance to fatigue, due to the resistance of the hollow flange to twisting. The stiffness of the flange moreover secures a better distribution of the stresses on the assembly bolts 11.

My invention extends to a method of manufacturing such a wheel.

On casting, the mould is provided with a tore-shaped core corresponding to the cavity 5. Said core is supported by a circular mounting 12 made of metallic tubes having a diameter of a few millimeters and mounting 12 is supported by metallic tubes 13 which are welded at various positions to the mounting 12, said tubes providing in the wheel, after the casting, circular orifices 14 suitably spaced on the outer surface of the flange. The tubular mounting 12 and the tubular supports 13 of the subular core serve, moreover as a degasifying circuit for the core, as the mounting is pierced with small spaced holes.

After stripping, it is only necessary to insert a drill or cutting tool, which is slightly larger in diameter than the tubes of the mounting 12, through the orifices 14 to sever said tube 12 and to take out, through said orifices, the sand and the several portions of the tube. In order to secure the tightness of the flange 4, it then suffices to thread the orifices 14 and to insert screw plugs thereinto.

I claim:

1. A process of molding a wheel with a toridal cavity comprising shaping a mold to the desired outer configuration of the wheel, inserting a toroidal core into the mold, supporting the toroidal core with a circular hollow tube supported on a plurality of axially extending hollow tubes, filling the mold with molding material, curing the material and venting the resultant gases through the hollow tubes, the core forming a toroidal cavity in the wheel and the hollow tubes forming orifices connected to the cavity, inserting a cutting tool through the orifices to cut the circular hollow tube and toroidal core into sections, and withdrawing the sections through the orifices.

2. A process as claimed in claim 1 comprising threading the orifices and inserting threaded plugs into the same.

References Cited in the file of this patent

UNITED STATES PATENTS

| 1,346,863 | Walther | July 20, 1920 |
| 1,746,297 | Zarnke | Feb. 11, 1930 |
| 2,105,317 | Frank | Jan. 11, 1938 |

FOREIGN PATENTS

| 214,813 | Great Britain | May 1, 1924 |
| 552,436 | Great Britain | Apr. 7, 1943 |
| 471,381 | Italy | Mar. 14, 1952 |

OTHER REFERENCES

Foundry Core Practice, by Dietert, 2nd ed., 1950, published by American Foundrymen's Society, Chicago, Ill., pp. 174, 178 and 500.